United States Patent
Proefke et al.

(10) Patent No.: US 11,607,960 B2
(45) Date of Patent: Mar. 21, 2023

(54) METHOD AND APPARATUS FOR PASSIVE POWER MODE CONTROL FOR ELECTRIC PROPULSION VEHICLES

(71) Applicant: GM GLOBAL TECHNOLOGY OPERATIONS LLC, Detroit, MI (US)

(72) Inventors: David T. Proefke, Troy, MI (US); Kurt L. Fischer, Waterford, MI (US); Aaron P. Creguer, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 16/553,434

(22) Filed: Aug. 28, 2019

(65) Prior Publication Data

US 2021/0061108 A1   Mar. 4, 2021

(51) Int. Cl.
  *B60L 15/20*   (2006.01)

(52) U.S. Cl.
  CPC ....... *B60L 15/2072* (2013.01); *B60L 2240/28* (2013.01); *B60L 2250/16* (2013.01); *B60L 2250/20* (2013.01); *B60L 2250/26* (2013.01); *B60L 2260/26* (2013.01)

(58) Field of Classification Search
  CPC .. B60L 15/2072; B60L 15/00; B60L 2260/26; B60L 2250/20; B60L 2250/16; B60L 2240/28; B60L 2250/26; B60L 58/12; B60L 1/00; B60L 2260/22; B60L 2250/12; B60L 2240/80; B60L 2250/22; B60L 2240/12; B60W 50/082; B60W 50/14; B60W 2050/146; Y02T 10/70; Y02T 10/72

USPC .......................................................... 701/22
  See application file for complete search history.

(56) References Cited

U.S. PATENT DOCUMENTS

| | | | | |
|---|---|---|---|---|
| 5,219,413 | A * | 6/1993 | Lineberger | B60K 28/04 180/272 |
| 10,194,017 | B2 * | 1/2019 | Skelton | B60R 11/02 |
| 2008/0291001 | A1 * | 11/2008 | Caspe-Detzer | F02D 41/042 340/438 |

(Continued)

OTHER PUBLICATIONS

Buenospizza, "Walkaway lock", Jul. 14, 2019, Tesla Motors Club, https://teslamotorsclub.com/tmc/threads/walk-away-lock.159445/ (Year: 2019).*

(Continued)

*Primary Examiner* — Geepy Pe
*Assistant Examiner* — Sean Patrick Reidy
(74) *Attorney, Agent, or Firm* — Lorenz & Kopf LLP (57) ABSTRACT

Method and apparatus for power mode control for electric propulsion vehicles are provided that include a sensor to detect a vehicle door cycle, a processor to establish an occurrence of a vehicle motion, a processor operative to initiate a timer having a default time duration in response to the occurrence of the vehicle motion and the vehicle door cycle and to generate a user prompt to extend the default time duration, the processor being further operative to transition an operating mode to a shutdown mode in response to an expiration of the time, and to extend to the default time duration in response to the user input, and a display operative to display a user interface in response to the user prompt and to receive a user input indicative of a request to extend the default time duration of the timer and to couple the user input to the processor.

18 Claims, 4 Drawing Sheets

(56) References Cited

U.S. PATENT DOCUMENTS

| | | | |
|---|---|---|---|
| 2014/0350825 A1* | 11/2014 | Tomik | B60K 28/04 |
| | | | 701/112 |
| 2018/0174419 A1* | 6/2018 | Biondo | G08B 21/0205 |
| 2019/0298273 A1* | 10/2019 | Strupp | G01P 15/097 |

OTHER PUBLICATIONS

Tesla, "Model 3 Owner's Manual", 2022, https://www.tesla.com/ownersmanual/model3/en_us/GUID-7A32EC01-A17E-42CC-A15B-2E0A39FD07AB.html (Year: 2022).*

* cited by examiner

METHOD AND APPARATUS FOR PASSIVE POWER MODE CONTROL FOR ELECTRIC PROPULSION VEHICLES

INTRODUCTION

The present disclosure relates generally to a system for controlling a power mode of an electric propulsion vehicle. More specifically, aspects of the present disclosure relate to systems, methods and devices for automatically controlling vehicle power mode in response to customer actions, while meeting expectations for ongoing system operation during driver departure from the vehicle.

In moving away from designing vehicle with internal combustion engines, many unique situations arise for manufactures. Electric vehicles do not have an internal combustion engine to start and remain running during operation of the vehicle. Currently drivers are accustomed to entering a vehicle, sitting in a seat, depressing a brake pedal, and rotating a key in an ignition switch or pressing a start/stop switch to start the operation of a vehicle. Drivers can hear the engine running and subsequently shut down the engine by rotating the key or pressing the start/stop button when they are finished with the vehicle. However, with electric vehicles, there may be no obvious "run mode" when initiating the vehicle.

Currently, when drivers enter an electric vehicle and depress a start button, the vehicle moves from an "off mode" to an "on mode" where all vehicle system, such as heat and air conditioning are active. When a driver is intending to leave the vehicle, the driver again depresses the start button to return the vehicle to the "off mode." In some vehicles, the vehicle may return to the "off mode" when the vehicle is in a parked condition and the vehicle has been idle for an extended period of time. However, there may be instances when drivers may want to have the vehicle continue performing certain functions during a time when the driver has departed the vehicle, such as maintaining heating while the driver is out scraping an icy windshield or continuing to operate air conditioning for other vehicle occupants when a drivers is running an errand, such as using an automated teller machine. It is desirable to provide a system to overcome these problems in order to provide a passive power mode control for electric propulsion vehicles in order to improve the customer experience.

The above information disclosed in this background section is only for enhancement of understanding of the background of the invention and therefore it may contain information that does not form the prior art that is already known to a person of ordinary skill in the art.

SUMMARY

Disclosed herein are human machine interface methods and systems and related control logic for provisioning computational systems, methods for making and methods for operating such systems, and motor vehicles equipped with onboard control systems. By way of example, and not limitation, presented are various embodiments of electric propulsion vehicle power mode transitions disclosed herein.

In accordance with an aspect of the present invention an apparatus having a sensor to detect a vehicle door state, a vehicle processor to establish an occurrence of a vehicle motion, a processor operative to initiate a timer having a default time duration in response to the occurrence of the vehicle motion and the vehicle door cycle and to generate a user prompt to extend the default time duration, the processor being further operative to transition a vehicle operating mode to a shutdown mode in response to an expiration of the time, and to extend to the default time duration in response to the user input, and a display operative to display a user interface in response to the user prompt and to receive a user input indicative of a request to extend the default time duration of the timer and to couple the user input to the processor.

In accordance with another aspect of the present invention including an authentication device detector to detect and authentication device and wherein the timer being initiated in response to an absence of an authentication device.

In accordance with another aspect of the present invention wherein the occurrence of a vehicle motion is indicative of a vehicle being driven over a predetermined speed threshold.

In accordance with another aspect of the present invention wherein the display is a touch sensitive display mounted within a vehicle cabin.

In accordance with another aspect of the present invention wherein the vehicle door cycle is indicative of a vehicle driver's door being opened and closed.

In accordance with another aspect of the present invention including a vehicle occupancy detector for detecting a driver occupancy and wherein the timer is initiated in response to a driver not being detected.

In accordance with another aspect of the present invention wherein the display is a mobile device operative to receive the user prompt via a wireless network and to transmit the user input via the wireless network.

In accordance with another aspect of the present invention wherein the processor is further operative to transition the vehicle operating mode to a propulsion mode in response to a control signal from a brake controller indicative of a brake pedal being depressed.

In accordance with another aspect of the present invention a method including determining an occurrence of a vehicle motion, receiving a first indicator of a vehicle door cycle, initiating a timer having a default time duration in response to the occurrence of the vehicle motion and the vehicle door state, generating a user prompt to extend the default time duration, displaying the user prompt to a user, receiving a user request to extend the default time duration, extending the default time duration to an extended time duration in response to the user request, and transitioning a vehicle operating mode to a shutdown mode in response to an expiration of the extended time duration.

In accordance with another aspect of the present invention including detecting a vehicle occupancy and wherein the time is initiated in response to the vehicle occupancy being indicative of an absence of a vehicle occupant.

In accordance with another aspect of the present invention including transitioning the vehicle operating mode to a propulsion mode in response to a control signal from a brake controller indicative of a brake pedal being depressed.

In accordance with another aspect of the present invention including extending the default time duration to the extended time duration in response to a detection of a vehicle cabin occupant.

In accordance with another aspect of the present invention including extending the default time duration to the extended time duration in response to a detection of an authentication device.

In accordance with another aspect of the present invention wherein the user prompt is displayed on a mobile device.

In accordance with another aspect of the present invention wherein the user prompt is displayed on a display within a vehicle cabin.

In accordance with another aspect of the present invention wherein the vehicle door cycle is indicative of a driver's door being opened and closed.

In accordance with another aspect of the present invention wherein the occurrence of the vehicle motion is indicative of a vehicle being driven for a predetermined distance.

In accordance with another aspect of the present invention wherein the user request is generated in response to a user input on a user interface.

In accordance with another aspect of the present invention a vehicle control system including an occupancy detector for detecting a vehicle cabin occupant, an authentication sensor for detecting an authentication device, a door state detector operative to detect a door state, a brake pedal detector for detecting an application of a brake pedal, a processor for transitioning a vehicle operating mode to a propulsion mode in response to the detection a vehicle cabin occupant, the detection of an authentication device, and the detection of the application of the brake pedal, the processor being further operative to initiate a timer for a default time duration in response to an absence of the detection of a vehicle cabin occupant, the absence of the detection of the authentication device and the detection of the door state, for generating a user prompt in response to the initiation of the timer, and for extending the default time duration to an extended time duration in response to a user request, and a user interface for displaying the user prompt and receiving the user request.

In accordance with another aspect of the present invention wherein the timer is initiated in response to a detected occurrence of a vehicle motion before the detection of the door state.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
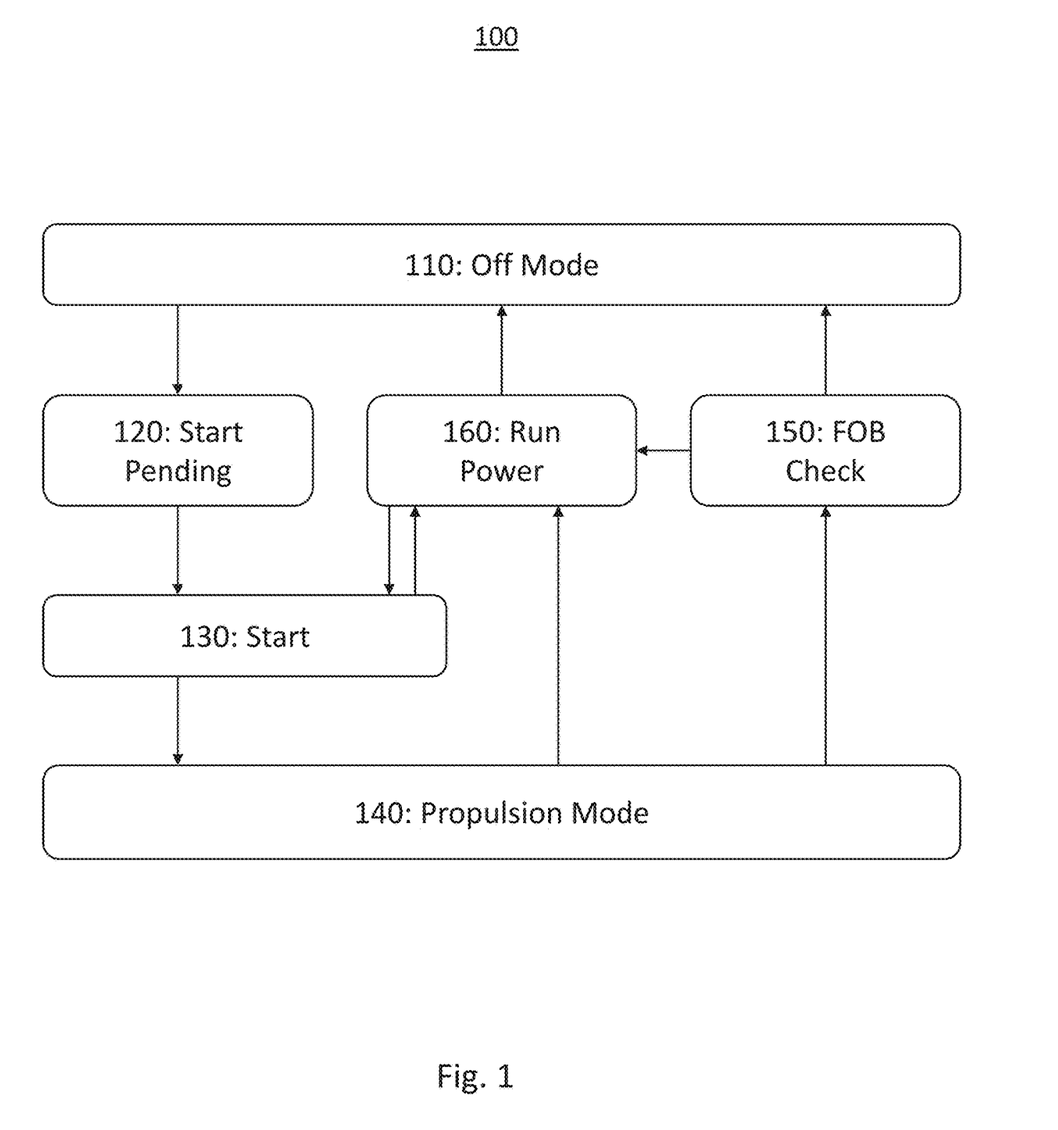
FIG. 1 shows an exemplary state chart for a passive power mode control for electric propulsion vehicles according to an exemplary embodiment of the present disclosure.

Turning now to FIG. 1, a state chart for a system 100 for a passive power mode control for electric propulsion vehicles according to an exemplary embodiment of the present disclosure is shown. The exemplary state chart 100 for the electric propulsion vehicle has a plurality of states, such as off mode 110, start pending 120, start 130, propulsion mode 140, FOB check 150, and run power mode 160. The exemplary system is operative to enhance the customer experience by automatically controlling vehicle power mode through normal customer actions, while meeting expectations for warming up/scraping vehicle, picking up mail, drive-in movie, etc. and emergency disruption of propulsion system. It is desirable to provide a system where the vehicle transitions between "off mode" and "on mode" solely by the drivers implied actions while in possession of an authorizing device.

During the off mode 110, the vehicle is in a powered down or standby mode. Few driver operable operations are engaged during the off mode. Operations such as security system, driver state monitoring, etc. are engaged during off mode 110.

Start pending 120 mode may be initiated in response to a detection of a driver presence, key fob or other authorizing device being present, and the brake pedal being pressed. In an exemplary embodiment, the start pending 120 mode is operative to unlock the steering column and to request activation of the propulsion system.

The start mode 130 is initiated in response to a request for activation of the propulsion system. The start mode may be used for the activation of the propulsion system and may include conditioning of batteries or any other activity required prior to allowing normal customer operation. The start mode 130 may be active when the propulsion system is activated, but motion has not been achieved. The vehicle may remain start mode 130 until the vehicle systems are initiated and then transition to run mode 160. If run mode 160 is initiated, a timer is started to keep the vehicle in start mode for a duration of time waiting for motion to be achieved. If the vehicle transmission is shifted into drive, or the vehicle achieves motion, the system is operative to move to the propulsion mode 140. If no motion is achieved within the duration of time, or the propulsion system has not become active within the duration of time, the system is operative to remain in run power mode 160 of may return to off power mode 110.

In run power mode 160 the user interface device within the vehicle is activated and is available to a vehicle occupant. For example, the run power mode 160 may be considered a "powered on" state where all customer operations are allowed with the exception of vehicle propulsion. A timer is initiated at the start of run power mode 160 and the system is operative to monitor for a request for a vehicle start of propulsion mode. If no request for propulsion mode is received during the duration of the time and the vehicle transmission selector is in park, the vehicle system is returned to the off power mode 110. If a request for the propulsion mode is received during the duration of the timer, the system mode is returned to the start mode 130 wherein the start mode time is initiated again.

Propulsion mode 140 activation may be based upon driver and key fob presence and brake pedal activation. During propulsion mode 140 the vehicle motion is enabled. After vehicle motion has exceeded a threshold speed, a flag may be set for use by a timeout operation after vehicle operation indicative that a vehicle has moved a predetermined distance for example, or has exceeded a threshold velocity. Propulsion mode 140 may be exited in response to an emergency request by the driver, such as a double press/long press of a shutdown user interface button, or the like, which returns the vehicle to run power mode 160. If the vehicle transmission is placed in park and the driver exits the vehicle, a fob check mode 150 may be initiated.

Fob check mode 150 is operative to determine if the key fob or other authentication device is present in the vehicle. This mode is initiated to prevent stranding of the vehicle and/or the driver within the vehicle. If the key fob is present, indicating that the driver will be able to restart the vehicle if desired, the power mode is changed to the off mode 110. If the fob is not detected, possibly indicating that the authorizing device is absent or inoperative, the power mode is changed to run power mode 160 for a period of time to allow the operator to re-enable propulsion and avoid being stranded.

Propulsion mode 140 may be terminated in response to door activity, such as the driver's door opening, in concert with another activity, such as vehicle motion or drive cycle. The propulsion mode 140 may be extended via user request via a user interface or the like. In an exemplary embodiment, this user extension may be only provided when the vehicle transmission is in the park position and may be further based on time, battery state of charge and/or charge coupler status.

According to an exemplary embodiment of the present disclosure, control of vehicle power mode may accommodate turning the vehicle off at speed, prevent turning off the vehicle with anti-strand capability when authenticating device is absent, ability to warm-up or scrape vehicle without immediate shutdown, max timeout for occupied vehicle, ability to maintain vehicle operation during valet handoff. The exemplary methodology may enable propulsion mode when authorizing device is present, brake pedal is active, and either driver is present or driver presence sensor is faulted and driver seatbelt is buckled and/or maintain propulsion mode until a maximum stationary propulsion timer has expired or an exit timer has expired. The exit and propulsion timers being modified by changes of transitions of the driver door from closed to ajar or open, transitions of transmission gear or shift lever position, drive cycles or motion being enabled or detected, changes in driver presence, brake pedal activations, driver seatbelt status, or closing of the driver door or valet mode status.

Figure 2:
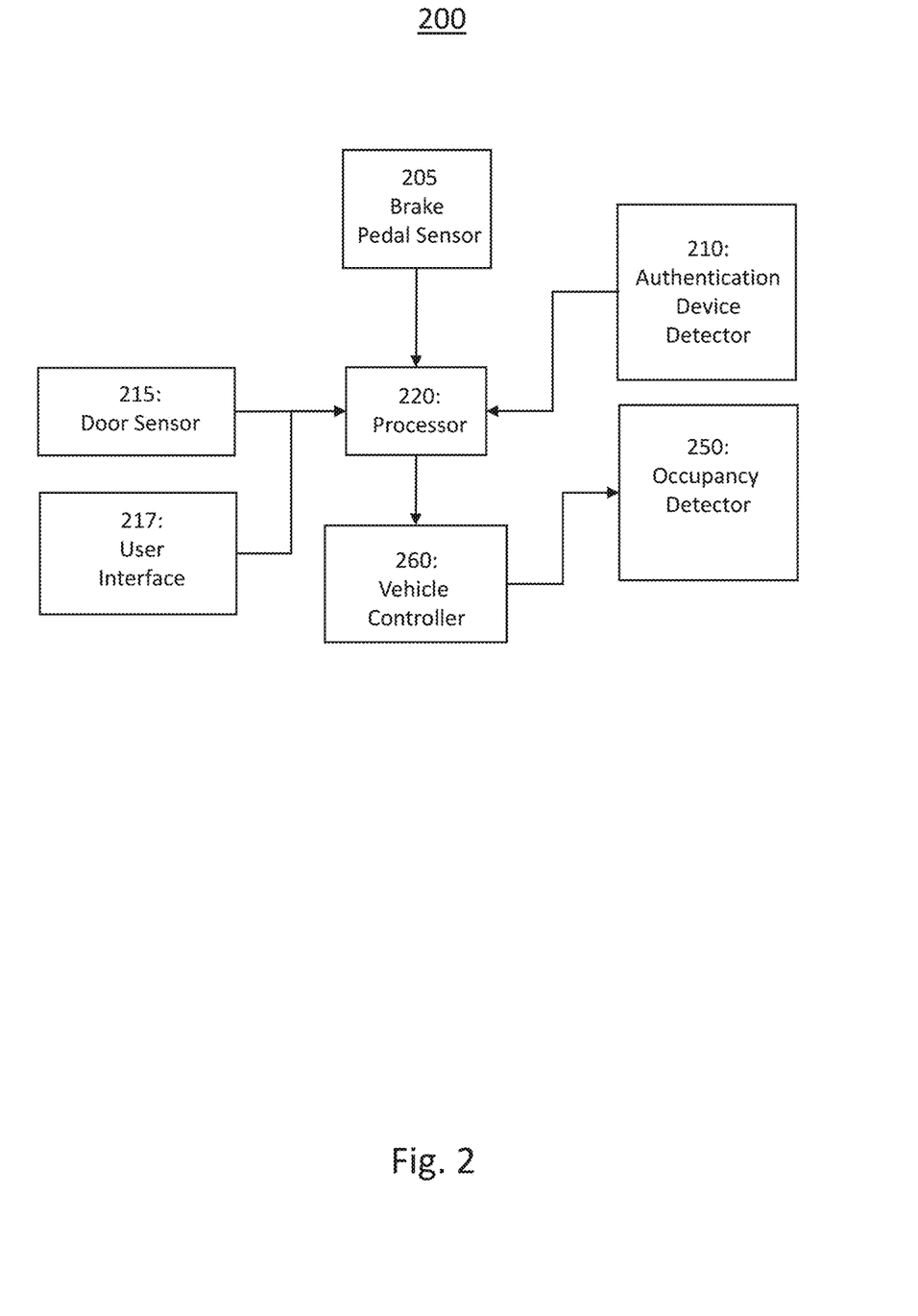
FIG. 2 shows an application for a passive power mode control for electric propulsion vehicles according to an exemplary embodiment of the present disclosure.

Turning now to FIG. 2, an exemplary system 200 for passive power mode control for electric propulsion vehicles according to an exemplary embodiment of the present disclosure is shown. The exemplary system 200 includes an occupancy detector 250, an authentication device detector 210, a brake pedal sensor 205, a vehicle controller 260, a door sensor 215, a user interface 217 and a processor 220.

The occupancy detector 250 is operative to establish if a vehicle driver is present in the vehicle The occupancy detector 250 may be a seat sensing gravity or pressure switch, or the like, operative to sense a driver sitting in the driver seat. Alternatively, the occupancy detector may be a motion sensing device, capacitive device, or a heat sensing device for detecting the presence of the driver in response to motion within the driver's seat, human body capacitance, or a human heat signature proximate to the drivers seat respectively. The occupancy detector 250 is operative to generate an occupancy control signal indicative of the occupancy state of the driver's seat and to couple this occupancy control signal to the processor 220.

The authentication device detector 210 is operative to determine the presence of a vehicle operation authentication device, such as a key fob. The authentication device detector 210 may be operative to transmit an electromagnetic polling signal which is received by the authentication device which is then operative to actively or passively transmit a coded response signal. The coded response signal may be indicative of the individual identify of the authentication device or a pass code preprogrammed into the device. In response to receiving the coded response signal, the authentication device detector 210 may be operative to couple an authentication control signal to the processor 220 indicative of the presence of the authentication device.

The brake pedal sensor 205 is operative to determine a state of the brake pedal such as depressed or not depressed. Alternatively, the brake pedal sensor 205 may be operative to determine a degree of actuation of the brake pedal, such as 25% depressed, 75% depressed, etc. The brake pedal sensor 205 may be then operative to generate a brake state control signal indicative of the actuation of the brake pedal and to couple this brake state control signal to the processor 220. The brake pedal control sensor 205 may be integral to a brake controller or the like and the brake state control signal may be initially received by the vehicle controller 260 and data indicative of the brake state may be then coupled to the processor 220.

The door sensor 215 is operative to determine a state of at least the driver's door of the vehicle. The vehicle state sensor 215 may be a mechanical switch, a photodiode, or other detection device operative to determine if a driver's door is open or closed. Additionally, the door sensor 215 may be operative to determine a degree to which the driver's door is open, such as 20% open, 3% open, or fully open. The door sensor 215 is operative to provide a door state control signal to the processor 220 indicative of the door state.

The user interface 217 may be operative to provide a human machine interface between the vehicle control system and the driver. The user interface 217 may be a touch sensitive display screen, a display, one or more buttons, dials, switches, etc., and or one or more light emitting diodes, audio generation devices, such as a speaker, or other indicators. The user interface 217 is operative to receive user requests such as a request for activation of a propulsion system, extension of a system timeout time duration, vehicle shutdown request, response to system enquiries, etc. In an exemplary embodiment, the user interface may be a touch sensitive display screen operative to display a plurality of user options for requesting time extensions to vehicle operation modes. These user options may include adding 10 minutes, turn off now, shutdown at a specific time, extend while vehicle charger is engaged, etc.

The vehicle controller 260 may be operative to control the vehicle operations in response to a control algorithm or the like. In an exemplary embodiment, the vehicle controller 260 may be operative to generate vehicle control signals for coupling to a brake controller, throttle controller, and/or steering controller or the like. The vehicle controller 260 may further be operative to generate system control signals for coupling to the processor 220, indicative of such information as speed of the vehicle, battery state and charge level, vehicle motion cycles, etc.

The processor 220 may be operative to receive control signals and data from the occupancy detector 250, authentication device detector 210, brake pedal sensor 205, vehicle controller 260, a door sensor 215, and user interface 217, and to establish a power mode for the vehicle. For example, activation of the power mode may be based on seat presence, authenticating device presence, and brake pedal. Deactivation of the power made may be determined based on vehicle motion cycles, door state, customer requests for time extensions and the like.

Figure 3:
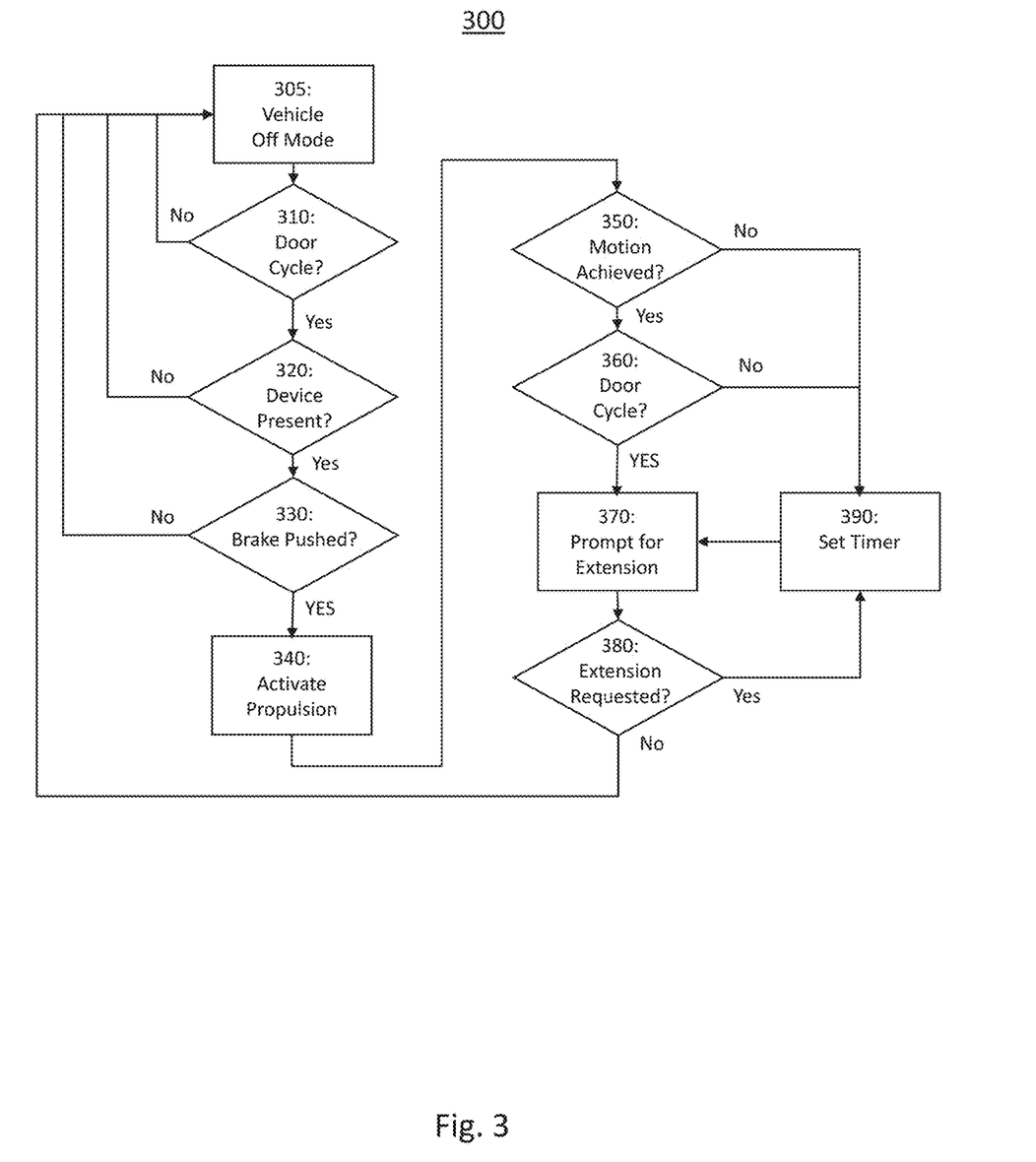
FIG. 3 shows a flow chart illustrating a method for a passive power mode control for electric propulsion vehicles according to an exemplary embodiment of the present disclosure.

Turning now to FIG. 3, another exemplary method 300 for passive power mode control for electric propulsion vehicles according to an embodiment of the present disclosure is shown. The exemplary method 300 is first initiated with the vehicle in the off mode 305. During the off mode, the vehicle may be in a reduced function operation mode, operative to detect incoming control signals from a control device such as a key fob and to monitor door lock states, door opening states, and the like. In this exemplary embodiment, the method is operative to monitor 310 a door opening state to determine if a door cycle has occurred. A door cycle may be when a door is opened from a closed state and then returned to the closed state. However, in alternate embodiments, a door cycle may be a door state transition, such as from open to closed or from closed to open or any combination thereof. The door may be a driver's door, thereby indicating that a driver is entering the vehicle. If the door has not been opened and closed, the method returns the vehicle operating state to the vehicle off mode 305.

If a door state change has been detected 310, the method is next operative to determine 320 if an authorizing device is present. The authorizing device may be a key fob or other mobile device. In one exemplary embodiment, the authorizing device is an application on a smart phone. In order to determine if an authorizing device is present, the system may be operative to transmit an electromagnetic polling request. The polling request may be encoded. The authorizing device is then operative to receive the polling request and to transmit an encoded reply to the system. If the encoded reply meets the security requirements of the system, the authorizing device is determined to be present and then method is then operative to determine 330 if the brake pedal has been pushed. If no response is received to the polling request, or the reply does not meet the security requirements of the system, then the method is operative to maintain the vehicle state in the off mode 305 and communicate the absence or failure to detect an authorizing device.

If the brake pedal has been detected as pushed 330, and an authorizing device is present, the method is then operative to transition 340 the vehicle operating state to a propulsion mode, transitioning through a start mode as need to enable the vehicle for operation. When transitioning the operating state to propulsion mode, the system may then be operative to monitor for an emergency shutoff request from a user in case of emergency.

Once the operating state is transitioned 340 to the propulsion mode, the method is next operative to monitor 350 for vehicle motion. Vehicle motion 350 may be determined in response to an indication from a vehicle controller, such as an indication of vehicle speed, a change of location indicated in response to a series of global positioning system locations, or in response to an inertial measurement unit output indicating an acceleration of the vehicle. If no motion is detected 350, the method is then operative to set a turn off timer 390.

If vehicle motion is detected 350, the method is next operative to monitor for a door cycle 360 indicative of a driver exiting the vehicle. If no door cycle is detected, the method is then operative to set a turn off timer 390. If the door cycle is detected 360 the method is next operative determine if the vehicle is in park and to provide a prompt 370 on a user interface requesting is an extension of the propulsion mode is requested.

The prompt for extension may be provided 370 to facilitate a vehicle occupant to extend vehicle operation. For example, if the driver is leaving the vehicle for a short period of time, say to clear an obstructed windshield, the passenger or driver may positively respond to the prompt for extension so as the vehicle heating and air conditioning system may continue to be operative. If an extension is requested 380 the method is operative to set a timer 390 according to the request. The request may be indicative of a time extension, such as 60 seconds, or may be simply a positive response and a default timer will be set.

After the timer has been set 390 and the duration of time of the timer elapsed, the method may prompt the user for an additional extension 370 of time. If a positive response is provided in response to the additional extension of time prompt, the timer is reset 390 and the process is repeated. If no response to the extension of time request is received 380, the method is then operative to change the vehicle operating mode to the off state 305.

Figure 4:
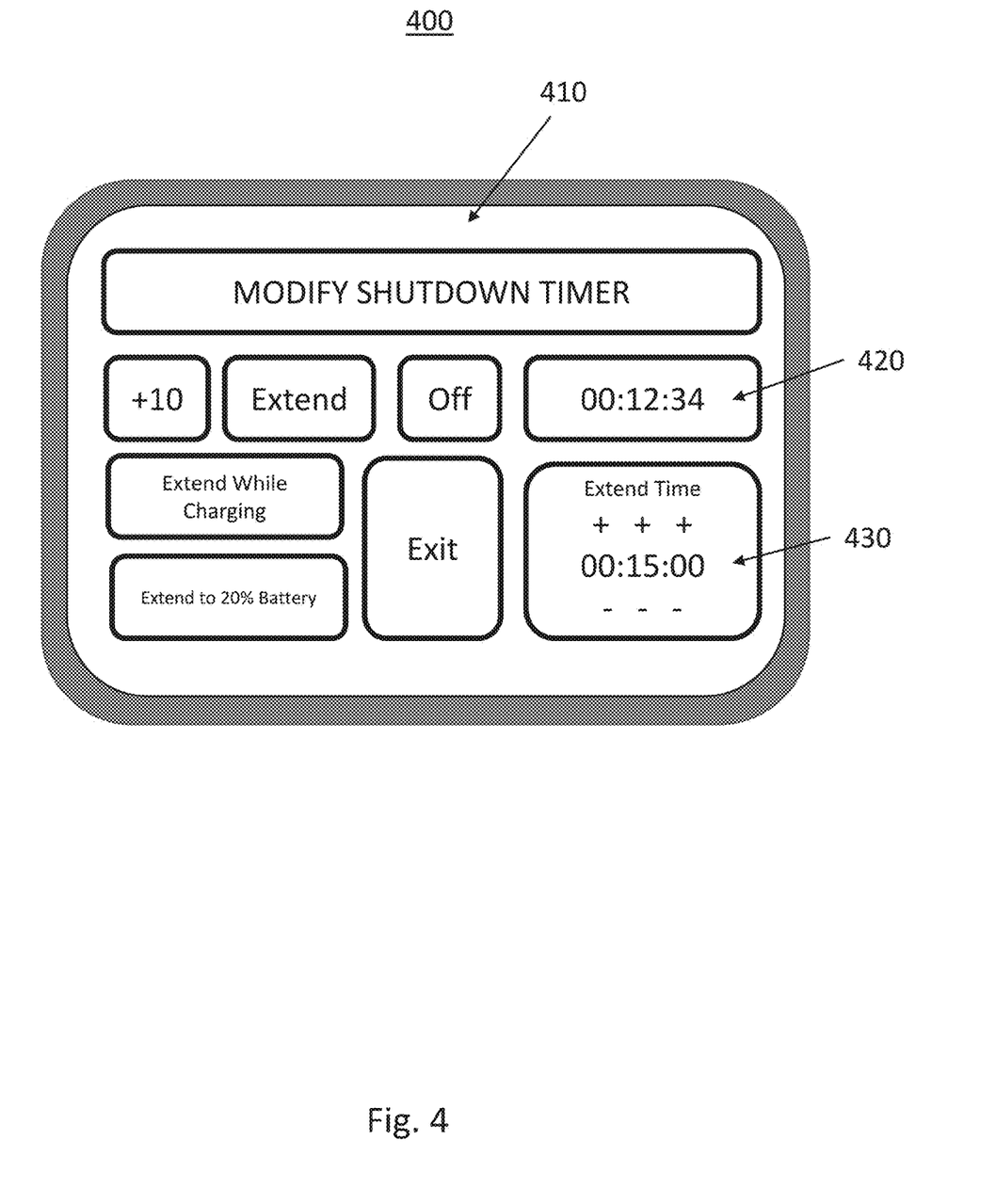
FIG. 4 shows a user interface for a passive power mode control for electric propulsion vehicles according to another exemplary embodiment of the present disclosure.

Turning now to FIG. 4, an exemplary user interface 400 for display by a passive power mode control for electric propulsion vehicles according to an embodiment of the present disclosure is shown. The exemplary user interface 400 may be implemented within a vehicle on a touch sensitive display screen 410. The user interface 400 may presented on the display in response to an initiation of a vehicle shutdown state transition. For example, if a system processor has determined that a vehicle has achieved motion during a propulsion state, the vehicle has been stopped and the transmission placed in a park position, a vehicle door, such as a driver's door has been opened and closed, the system may assume that the vehicle operation is completed and the vehicle operating state should be transitioned to an off mode. However, an occupant may still be in the vehicle and may wish to extend the propulsion mode to retain operation of various vehicle functions, such as heating and cooling, entertainment, window operation etc.

The user interface 400 may be presented on the vehicle display in response to an initiation of a shutdown state transition by the vehicle controller or may be presented any time the vehicle is in propulsion mode and the vehicle is parked. The user interface 400 may be configured to present many extension options to a vehicle occupant, such as extending a countdown time by 10 minutes, extending a countdown time a user defined amount in response to a user entry 430, to extend the mode until a vehicle battery reaches a certain charge level, or to extend the vehicle mode while the vehicle is connected to a charger. A countdown timer 420 may be depicted on the user interface 400 to provide a user feedback on how much time is remaining until a shutdown state transition.

The user interface 400 may alternatively be presented on a mobile electronic device, allowing a remote user the ability to extend the vehicle operating mode. For example, notification data may be transmitted via the vehicle transmitter to a user mobile device indicative of the shutdown state transition. The mobile device may then present a user interface to the driver in response to the notification data providing the driver an interface to extend the current operating mode. The user interface may receive an extension request from a driver and transmit this data back to the vehicle extending the current operating mode. The vehicle may be further operative to transmit an indication of a time of a subsequent mode transition, a vehicle operating state and/or of a vehicle battery charge state.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a sensor to detect a vehicle door cycle;
   a vehicle controller to establish an occurrence of a vehicle motion;
   a processor operative to initiate a timer having a default time duration and to generate a user prompt to extend the default time duration in response to the vehicle operating mode being in a propulsion mode, the occurrence of the vehicle motion after an activation of the propulsion mode, and the vehicle door cycle detected after the occurrence of the vehicle motion, the processor being further operative to transition the vehicle operating mode to a shutdown mode in response to an expiration of the default time duration, and to extend the default time duration in response to a user input; and
   a display operative to display a user interface in response to the user prompt and to receive the user input indicative of a request to extend the default time duration of the timer and to couple the user input to the processor.

2. The apparatus of claim 1 further including an authentication device detector operative to detect an authentication device and wherein the timer being initiated in response to an absence of an authentication device.

3. The apparatus of claim 1 wherein the occurrence of a vehicle motion is indicative of a vehicle being driven for a predetermined distance.

4. The apparatus of claim 1 wherein the display comprises a touch sensitive display mounted within a vehicle cabin.

5. The apparatus of claim 1 wherein the vehicle door cycle is indicative of a vehicle driver's door being opened and closed.

6. The apparatus of claim 1 further including a vehicle occupancy detector operative for detecting a driver occupancy and wherein the timer is initiated in response to a driver not being detected.

7. The apparatus of claim 1 wherein the display comprises a mobile device operative to receive the user prompt via a wireless network and to transmit the user input via the wireless network.

8. A method comprising:
   determining via an inertial measurement unit an occurrence of a vehicle motion;
   receiving via a door sensor a first indicator of a vehicle door cycle;
   transitioning a vehicle operating mode to a propulsion mode in response to a control signal from a brake controller indicative of a brake pedal being depressed;
   initiating a timer having a default time duration in response to the vehicle operating mode being in the propulsion mode, the occurrence of the vehicle motion after an activation of the propulsion mode, and the vehicle door cycle after the occurrence of the vehicle motion;
   generating a user prompt with a processor to extend the default time duration in response to the vehicle operating mode being in the propulsion mode, the occurrence of the vehicle motion the vehicle door cycle and the initiation of the timer,
   displaying the user prompt to a user on a user interface;
   receiving a user request at the processor to extend the default time duration via the user interface;
   extending the default time duration with the processor to an extended time duration in response to the user request; and
   transitioning a vehicle operating mode to a shutdown mode with the processor in response to an expiration of the extended time duration.

9. The method of claim 8 further including detecting a vehicle occupancy and wherein the time is initiated in response to the vehicle occupancy being indicative of an absence of a vehicle occupant.

10. The method of claim 8 further including extending the default time duration to the extended time duration in response to a detection of a vehicle cabin occupant.

11. The method of claim 8 further including extending the default time duration to the extended time duration in response to a detection of an authentication device.

12. The method of claim 8 wherein the user prompt is displayed on a mobile device.

13. The method of claim 8 wherein the user prompt is displayed on a display within a vehicle cabin.

14. The method of claim 8 wherein the vehicle door cycle is indicative of a driver's door being opened and closed.

15. The method of claim 8 wherein the occurrence of the vehicle motion is indicative of a vehicle being driven for a predetermined distance.

16. The method of claim 8 wherein the user request is generated in response to a user input on a user interface.

17. A vehicle control system comprising:
    an occupancy detector for detecting a vehicle cabin occupant;
    an authentication sensor for detecting an authentication device;
    a door state detector operative to detect a door cycle;
    a processor operative to initiate a timer for a default time duration in response to an absence of the detection of a vehicle cabin occupant, an absence of a detection of the authentication device and a detection of the vehicle operating mode being in a propulsion mode, an occurrence of a vehicle motion after an activation of the propulsion mode, and the door cycle detected after the occurrence of the vehicle motion, generate a user prompt in response to the initiation of the timer, and for extending the default time duration to an extended time duration in response to a user request; and
    a user interface for displaying the user prompt and receiving the user request.

18. The vehicle control system of claim 17 wherein the timer is initiated in response to a detected occurrence of a vehicle motion before the detection of the door cycle.

* * * * *